(12) United States Patent
Chuang

(10) Patent No.: US 11,964,723 B2
(45) Date of Patent: Apr. 23, 2024

(54) BICYCLE SADDLE ACCESSORY COUPLING DEVICE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 564 days.

(21) Appl. No.: 17/178,393

(22) Filed: Feb. 18, 2021

(65) Prior Publication Data
US 2022/0017171 A1 Jan. 20, 2022

(30) Foreign Application Priority Data
Jul. 16, 2020 (TW) .................. 109124037

(51) Int. Cl.
*B62J 1/28* (2006.01)

(52) U.S. Cl.
CPC ...................... *B62J 1/28* (2013.01)

(58) Field of Classification Search
CPC ........................................................ B62J 1/28
USPC ....................................................... 224/427
See application file for complete search history.

(56) References Cited

U.S. PATENT DOCUMENTS

| | | | | |
|---|---|---|---|---|
| 4,274,649 A * | 6/1981 | Vanderhorst | ........... | B62K 27/12 280/204 |
| 5,127,563 A * | 7/1992 | Chan | ........... | B62J 9/26 224/438 |
| 5,170,981 A * | 12/1992 | Lin | ........... | B62J 9/27 248/311.2 |
| 5,190,345 A * | 3/1993 | Lin | ........... | B62J 9/26 224/427 |
| 5,332,134 A * | 7/1994 | Chen | ........... | B62J 7/04 224/558 |
| 5,496,089 A * | 3/1996 | Muderlak | ........... | B62J 9/26 224/427 |
| 7,000,813 B2 * | 2/2006 | Gilstrap | ........... | B62J 11/00 224/427 |
| 7,654,550 B2 * | 2/2010 | Chuang | ........... | B62J 9/27 224/427 |
| 8,104,652 B2 * | 1/2012 | Yeh | ........... | B62J 9/26 224/427 |
| 10,183,716 B2 * | 1/2019 | Chuang | ........... | B62J 9/27 |
| 10,308,303 B2 * | 6/2019 | Chuang | ........... | B62J 9/26 |
| 10,604,204 B2 * | 3/2020 | Chee | ........... | B62J 9/26 |

(Continued)

FOREIGN PATENT DOCUMENTS

| | | |
|---|---|---|
| CN | 201961431 U | 9/2011 |
| CN | 204077880 U | 1/2015 |

(Continued)

*Primary Examiner* — Peter N Helvey
(74) *Attorney, Agent, or Firm* — Muncy, Geissler, Olds & Lowe, P.C.

(57) ABSTRACT

A bicycle saddle accessory coupling device includes a body, a first accessory, a second accessory, and a positioning unit. The body includes an attaching portion coupled to a bicycle saddle, a first connecting portion, and a second connecting portion located between the attaching portion and the first connecting portion. The first accessory includes a first guiding portion removably connected to the first connecting portion and a first coupling portion. The second accessory includes a second guiding portion removably connected to the second connecting portion and a second coupling portion. The positioning unit is disposed on the body and removably coupled to the first and coupling portions.

4 Claims, 14 Drawing Sheets

(56) References Cited

U.S. PATENT DOCUMENTS

| | | | |
|---|---|---|---|
| 11,661,132 B2* | 5/2023 | Chuang | B62J 9/27 |
| | | | 224/427 |
| 2005/0035165 A1* | 2/2005 | Tsai | B62H 5/00 |
| | | | 224/427 |
| 2008/0017681 A1* | 1/2008 | Bigolin | B62J 9/27 |
| | | | 224/427 |
| 2008/0111344 A1 | 5/2008 | Chuang | |
| 2008/0179473 A1 | 7/2008 | Chuang | |
| 2015/0197302 A1* | 7/2015 | Lin | B62J 7/04 |
| | | | 224/427 |
| 2018/0037285 A1 | 2/2018 | Chuang | |
| 2018/0037286 A1 | 2/2018 | Chuang | |
| 2019/0100266 A1 | 4/2019 | Chee | |

FOREIGN PATENT DOCUMENTS

| | | |
|---|---|---|
| CN | 212220446 U | 12/2020 |
| DE | 9203616 U1 | 5/1992 |
| DE | 202009009916 U1 | 10/2009 |
| DE | 202014010491 U1 | 10/2015 |
| EP | 2028087 A1 | 2/2009 |
| EP | 2085303 A2 | 8/2009 |
| NL | 1010116 C1 | 11/1998 |
| TW | 200800709 A | 1/2008 |
| TW | I306070 B | 2/2009 |
| TW | M364037 U | 9/2009 |
| TW | M593766 U | 4/2020 |
| WO | WO2006030259 A1 | 3/2006 |
| WO | WO2010111829 A1 | 10/2010 |

* cited by examiner

BICYCLE SADDLE ACCESSORY COUPLING DEVICE

BACKGROUND OF THE INVENTION

The present invention relates to a coupling device and, more particularly, to a coupling device for indirectly attaching a plurality of accessories to a bicycle saddle.

Taiwan Patent No. I306070 discloses a fixing device for a bicycle saddle bag. The fixing device includes a body and a fixing member. The body includes a bottom having a coupling section. A first end of the coupling section has a positioning portion. A second end of the coupling portion has a coupling groove. An insertion seat is disposed on a side of the fixing member and is used to connect with a saddle bag. A positioning end is formed on an end of the fixing member, and engaging holes are provided in another end of the fixing member opposite to the positioning end. The positioning end is secured to the positioning portion of the body. Fasteners extend through the engaging holes to be in threading connection with the coupling groove of the body. Thus, the fixing member can be rapidly assembled to the coupling section of the body while reducing the number of parts.

However, the insertion seat of the above fixing device can only allow a user to mount a saddle bag but cannot provide attachment of different accessories. Thus, it is not a good fixing device for bicycles with limited spaces for accessories.

BRIEF SUMMARY OF THE INVENTION

The present invention provides a bicycle saddle accessory coupling device that can indirectly and rapidly couple a plurality of accessories to a bicycle saddle.

A bicycle saddle accessory coupling device according to the present invention comprises a body, a first accessory, a second accessory, and a positioning unit. The body includes an attaching portion configured to be coupled to a bicycle saddle, a first connecting portion, and a second connecting portion located between the attaching portion and the first connecting portion. The first accessory includes a first guiding portion removably connected to the first connecting portion and a first coupling portion. The second accessory includes a second guiding portion removably connected to the second connecting portion and a second coupling portion. The positioning unit is disposed on the body and removably coupled to the first coupling portion and the second coupling portion.

In an example, the first connecting portion includes two sides each having a first guiding edge. The first guiding portion includes two sidewalls each having a first guiding groove removably coupled with an associated one of the first guiding edges. The second connecting portion is in a form of a groove and includes two sidewalls each having a second guiding groove. The second guiding portion includes two sides each having a second guiding edge removably coupled with an associated one of the second guiding grooves.

In an example, each of the first and second guiding grooves is a dovetail groove.

In an example, the first accessory includes a first control member extending from and pivotable relative to the first guiding portion. The first coupling portion is disposed on the first control member and is selectively coupled with the positioning unit in response to pivotable movement of the first control member relative to the first guiding portion.

In an example, the second coupling portion is formed on a bottom side of the second guiding portion. The positioning unit includes a second control member extending from the first connecting portion and pivotable relative to the second connecting portion. The second control member includes a first limiting portion removably coupled with the first coupling portion and a second limiting portion removably coupled with the second coupling portion. The first limiting portion is formed on a bottom side of the second control member and is selectively coupled with the first coupling portion in response to the pivotal movement of the first control member relative to the first guiding portion. The second limiting portion is formed on a top side of the second control member and is selectively coupled with the second coupling portion in response to the pivotal movement of the second control member relative to the second connecting portion.

In an example, the bottom side of the second guiding portion includes an abutting portion opposite to the second coupling portion. The abutting portion abuts against the first limiting portion when the second guiding portion is coupled with the second guiding grooves.

In an example, the body includes a through-hole extending through one of the two sidewalls of the second connecting portion and intercommunicating with the second connecting portion. The second coupling portion is formed on one of the second guiding edges. The positioning unit includes a first limiting portion formed on a bottom side of the first connecting portion and a second control member extending through the through-hole and movable relative to the body. The first limiting portion is selectively coupled with the first coupling portion in response to the pivotal movement of the first control member relative to the first guiding portion. The second control member includes a second limiting portion and a pressing portion on two opposite ends of the second control member, respectively. The second limiting portion is selectively coupled with the second coupling portion in response to movement of the second control member relative to the body. The pressing portion is selectively exposed outside of the through-hole in response to the movement of the second control member relative to the body.

In an example, the positioning unit further includes an elastic element disposed between the second control member and the second connecting portion. The elastic element is selectively compressed by the second control member in response to the movement of the second control member relative to the body.

In an example, the second guiding portion includes a first pivotal end, and the second accessory includes a second operative portion having a second pivotal end pivotably connected to the first pivotal end.

In an example, the second guiding portion includes a first pivotal end. The second accessory further includes a second operative portion and a pivotal arm. The second operative portion includes a second pivotal end. The pivotal arm includes a third pivotal end and a fourth pivotal end which are formed on two opposite ends of the pivotal arm and which are pivotably connected to the first pivotal end and the second pivotal end, respectively.

In view of the above, the first and second accessories can be indirectly attached to the bicycle saddle via the body of the bicycle saddle accessory coupling device according to the present invention.

The present invention will become clearer in light of the following detailed description of illustrative embodiments of this invention described in connection with the drawings.

DETAILED DESCRIPTION OF THE INVENTION

Figure 1:
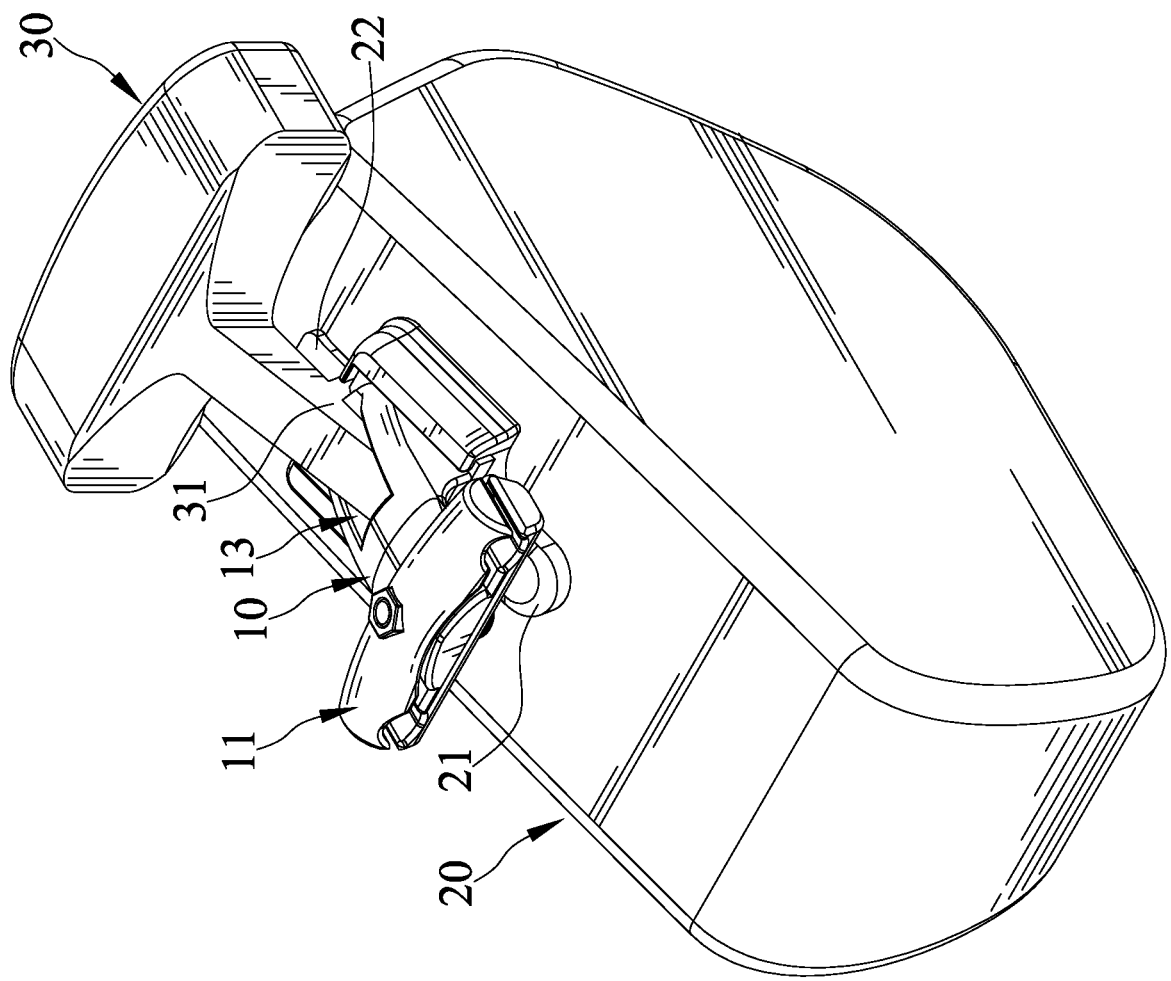
FIG. 1 is a perspective view of a bicycle saddle accessory coupling device of a first embodiment according to the present invention.
Figure 2:
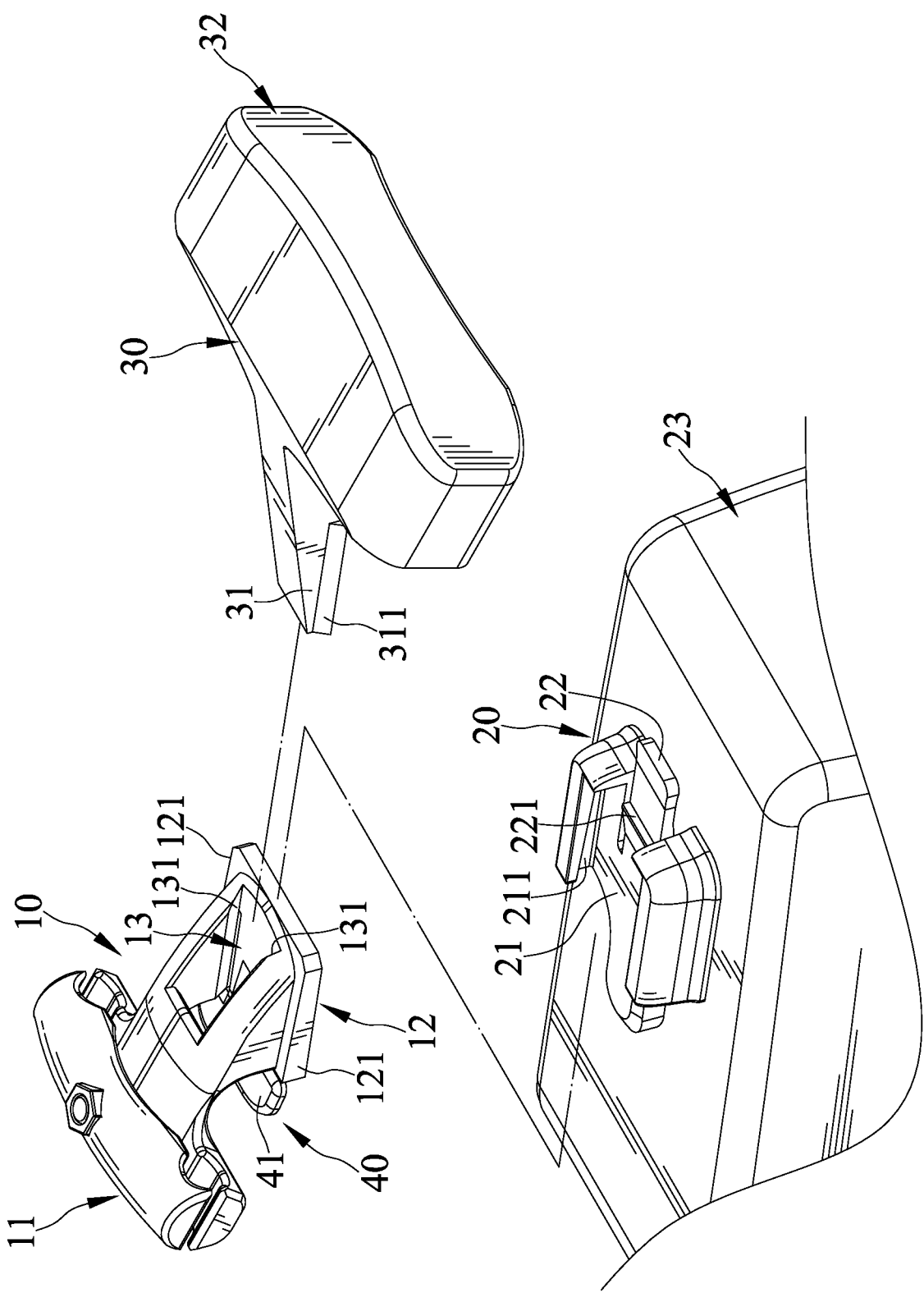
FIGS. 2 and 3 exploded, perspective views of the bicycle saddle accessory coupling device of FIG. 1.
Figure 3:
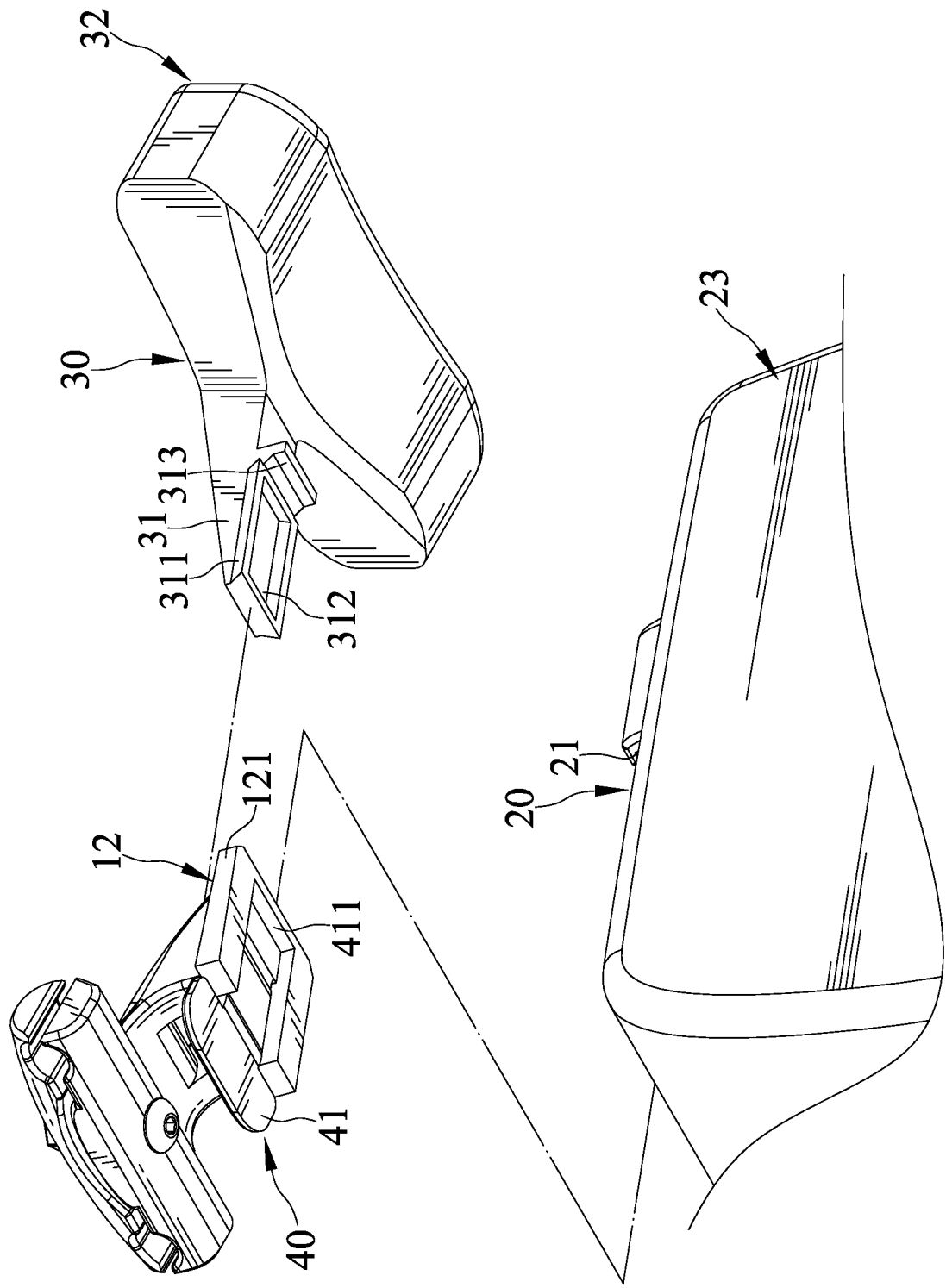
Figure 4:
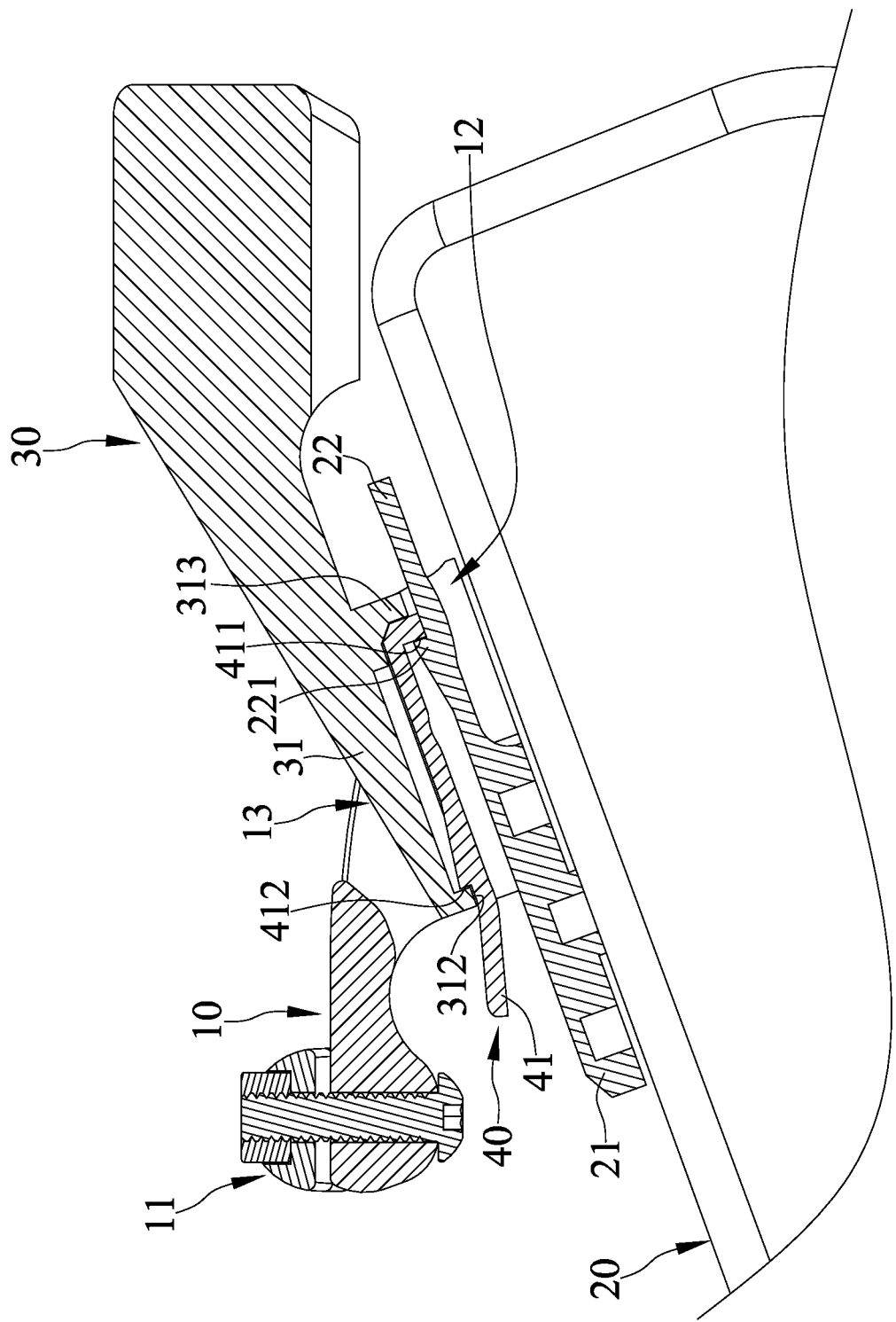
FIGS. 4 and 5 are diagrammatic views illustrating use of the bicycle saddle accessory coupling device of FIG. 1.
Figure 5:
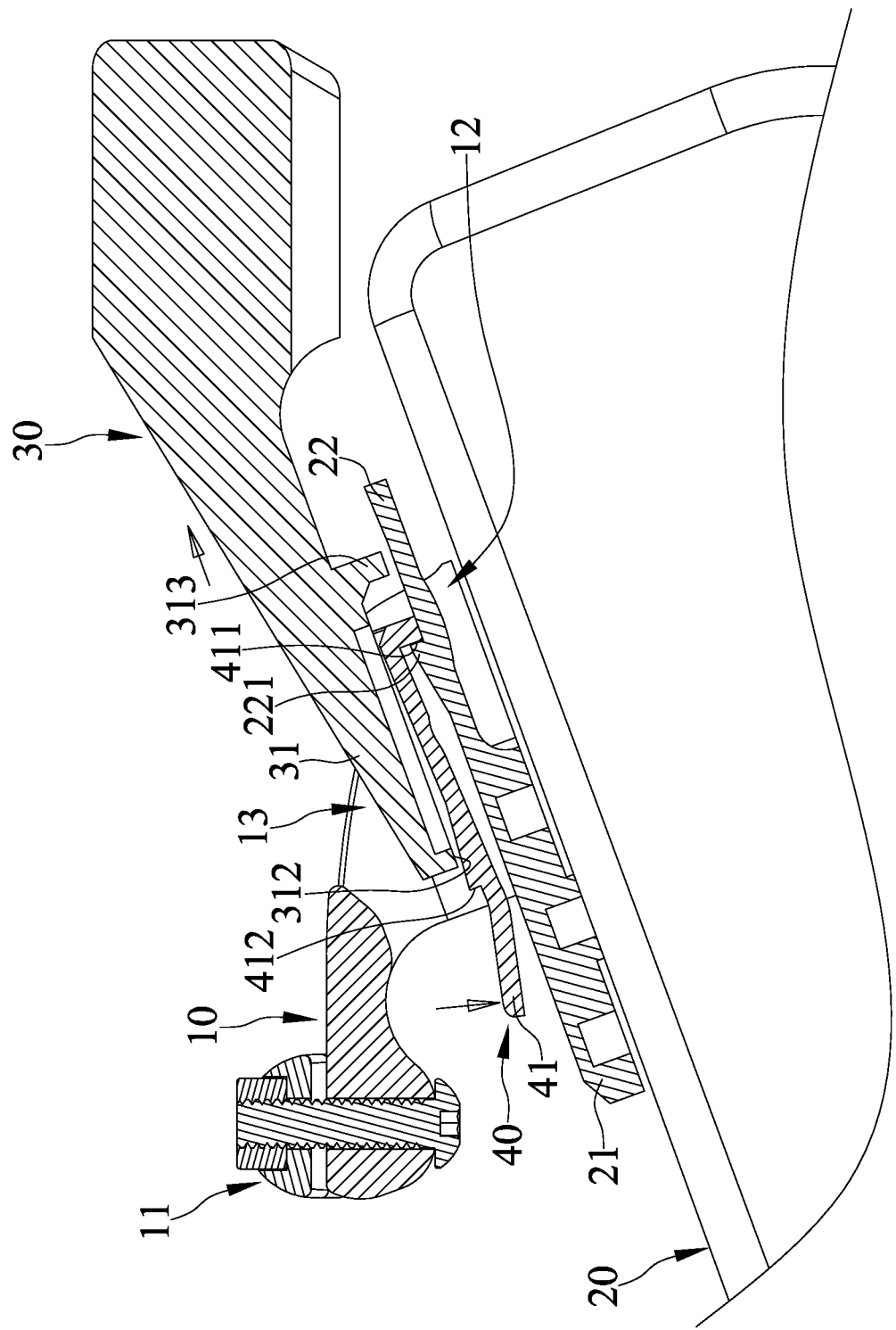
Figure 6:
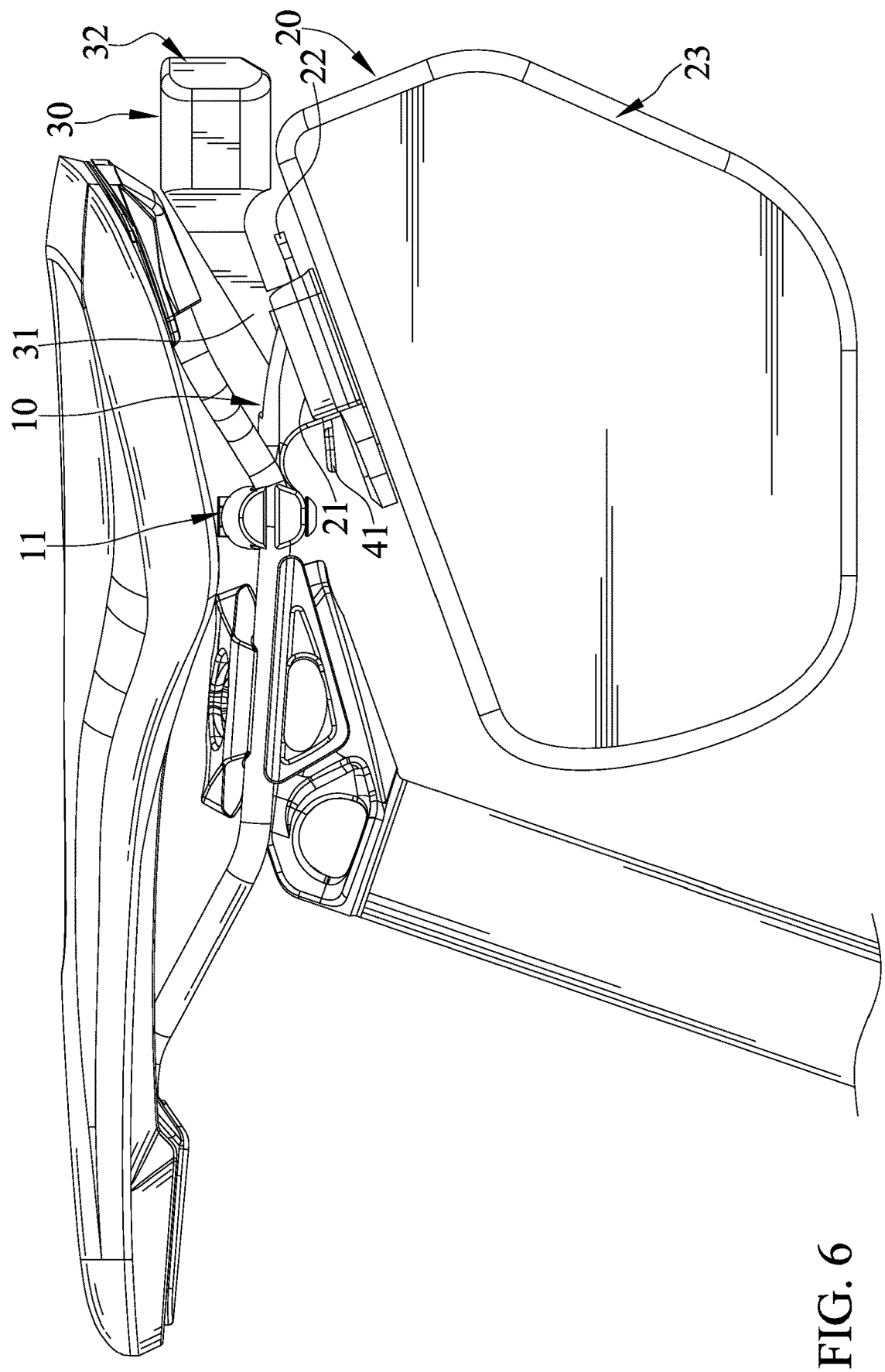
FIG. 6 is a diagrammatic view illustrating attachment of the bicycle saddle accessory coupling device of FIG. 1 to a bicycle saddle.
Figure 7:
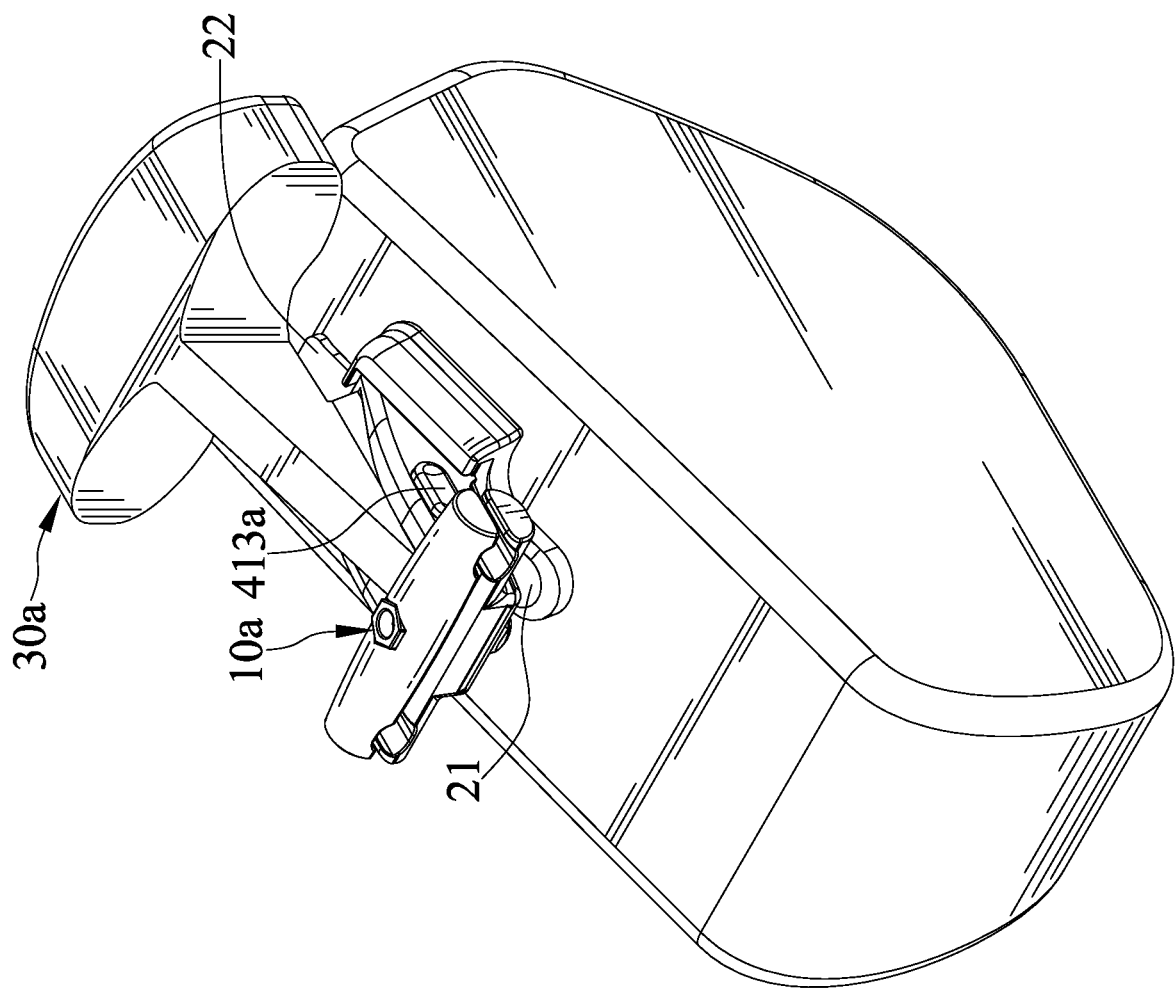
FIG. 7 is a perspective view of a bicycle saddle accessory coupling device of a second embodiment according to the present invention.
Figure 8:
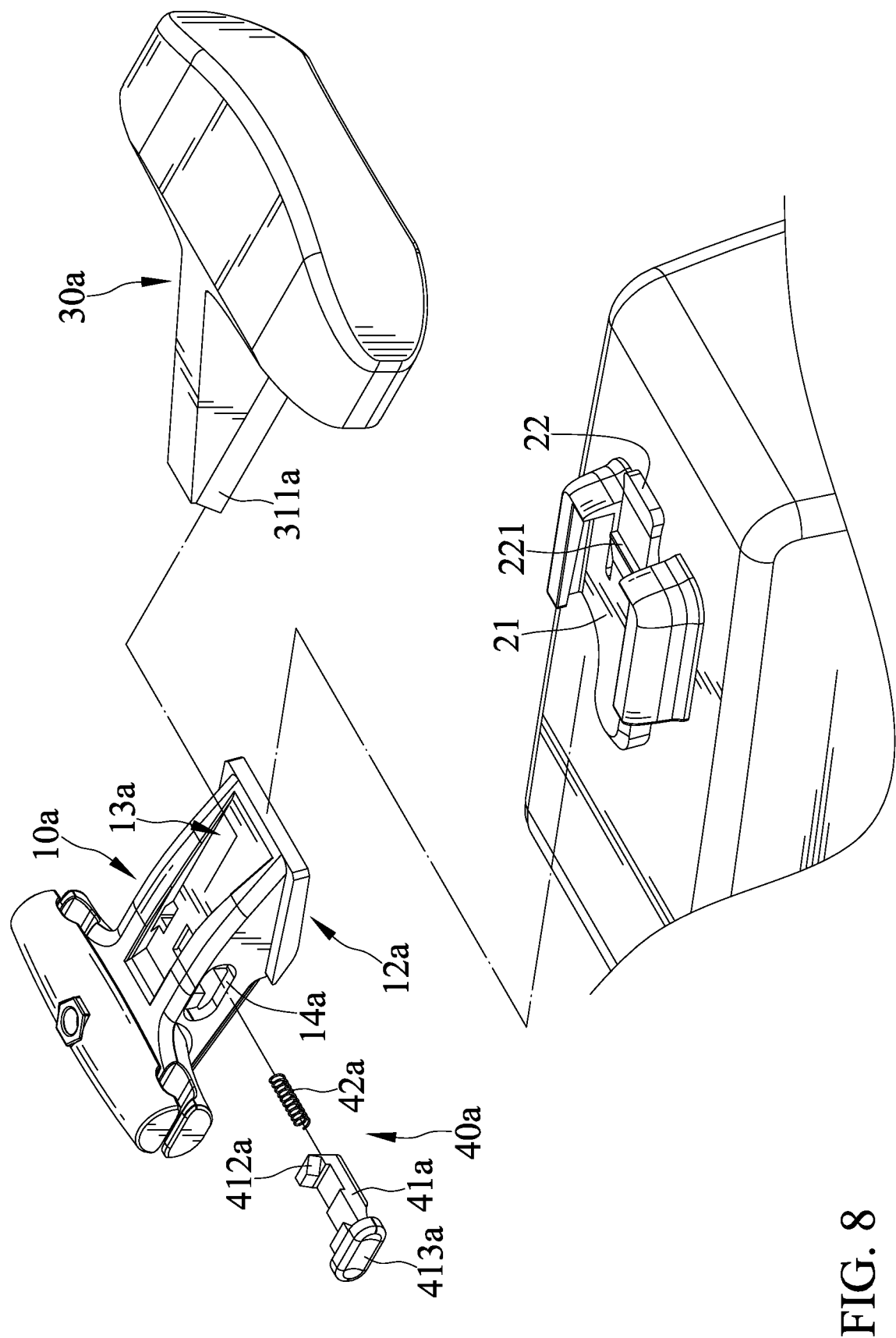
FIGS. 8 and 9 are exploded, perspective views of the bicycle saddle accessory coupling device of FIG. 7.
Figure 9:
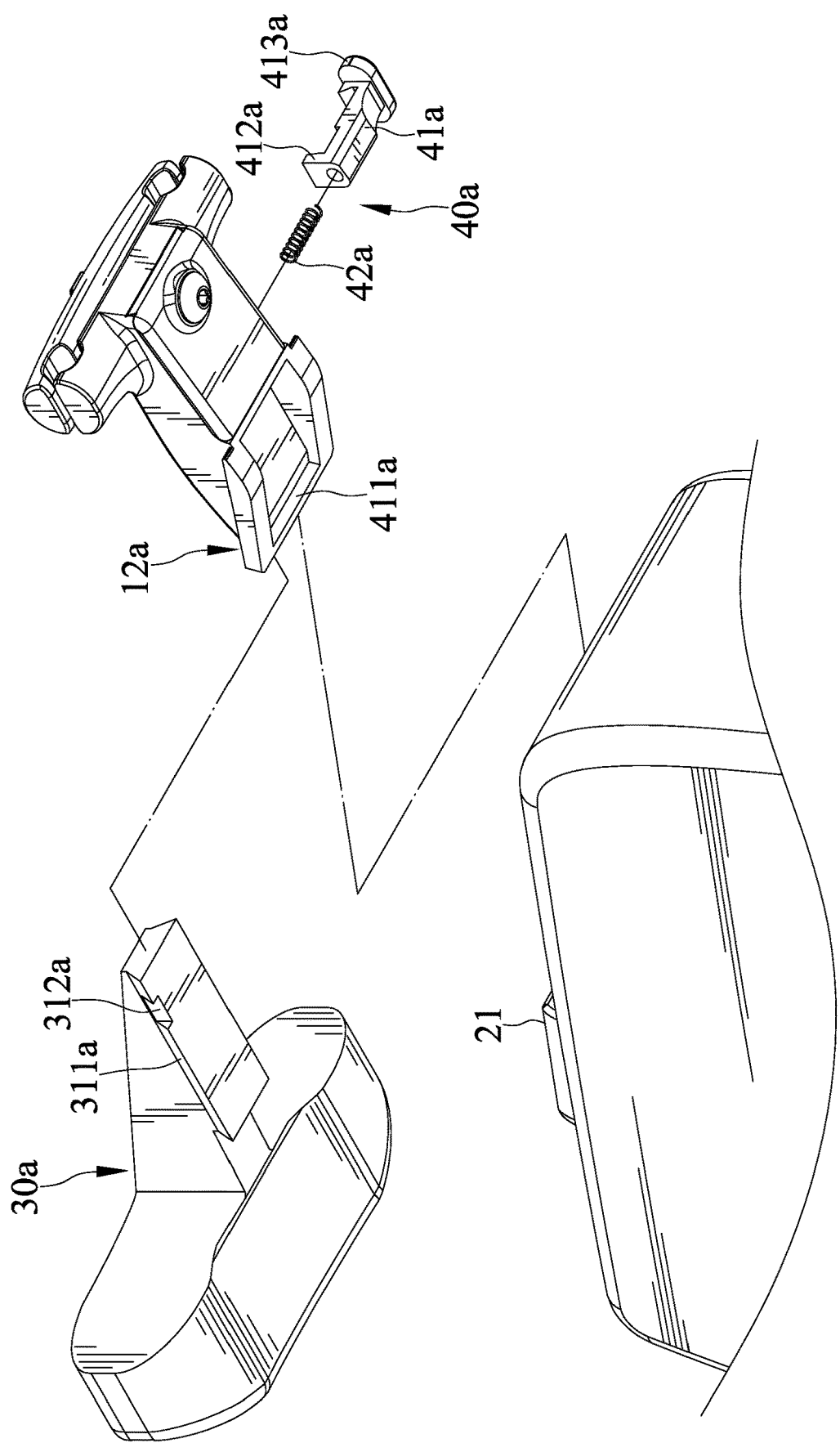
Figure 10:
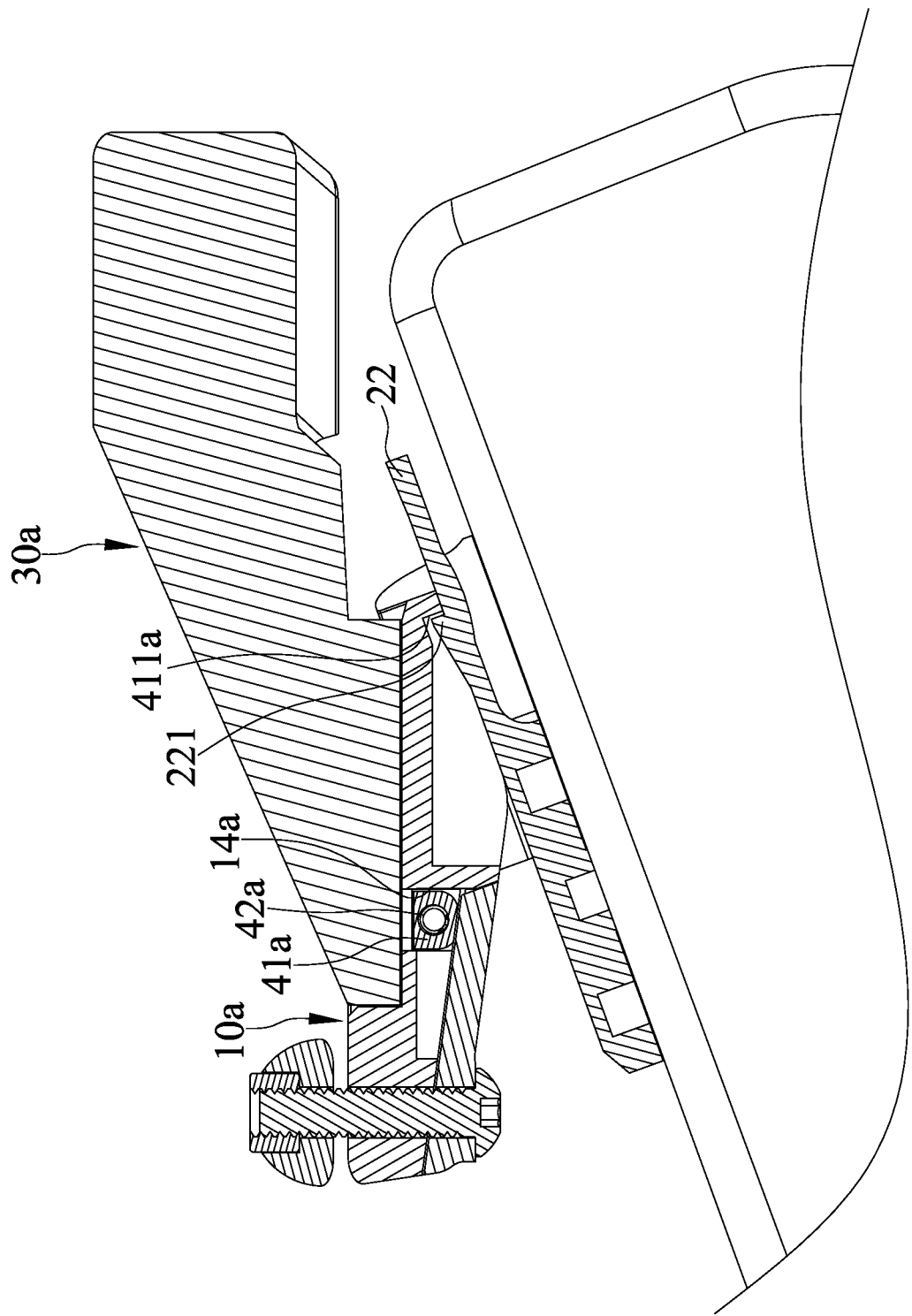
FIGS. 10-12 are diagrammatic views illustrating use of the bicycle saddle accessory coupling device of FIG. 7.
Figure 11:
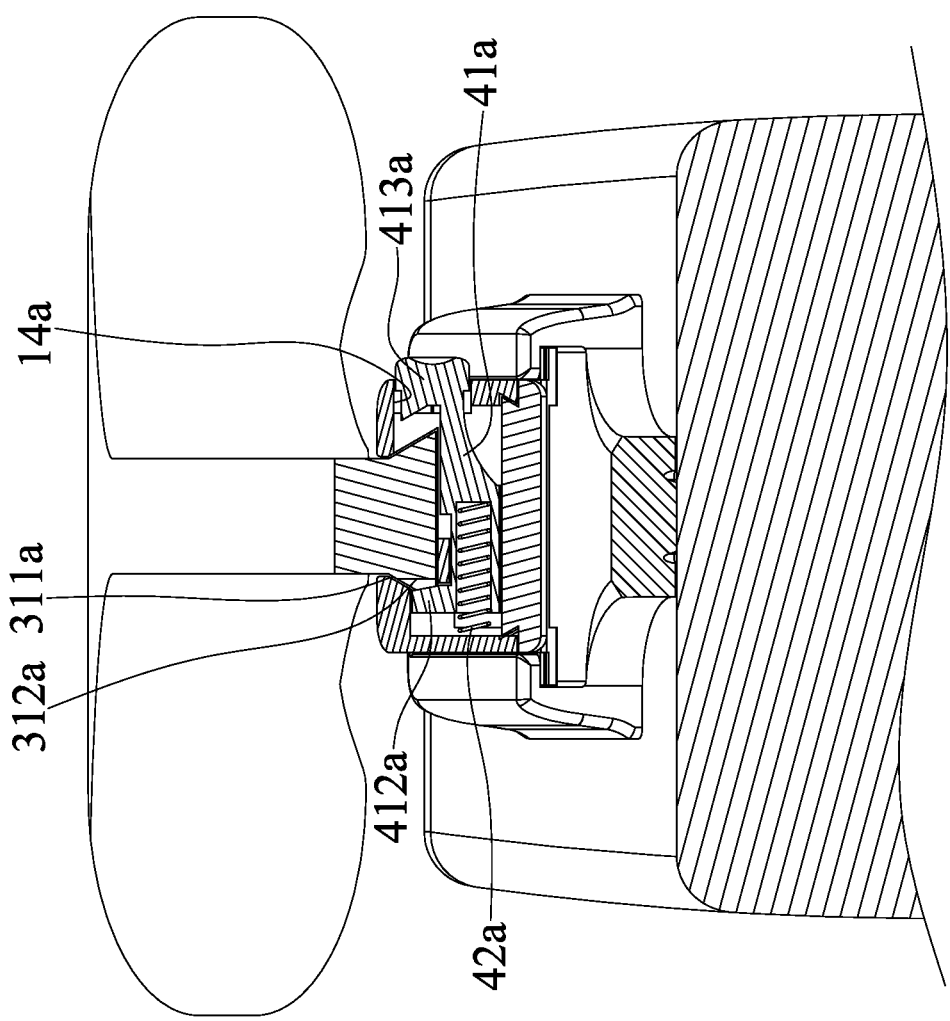
Figure 12:
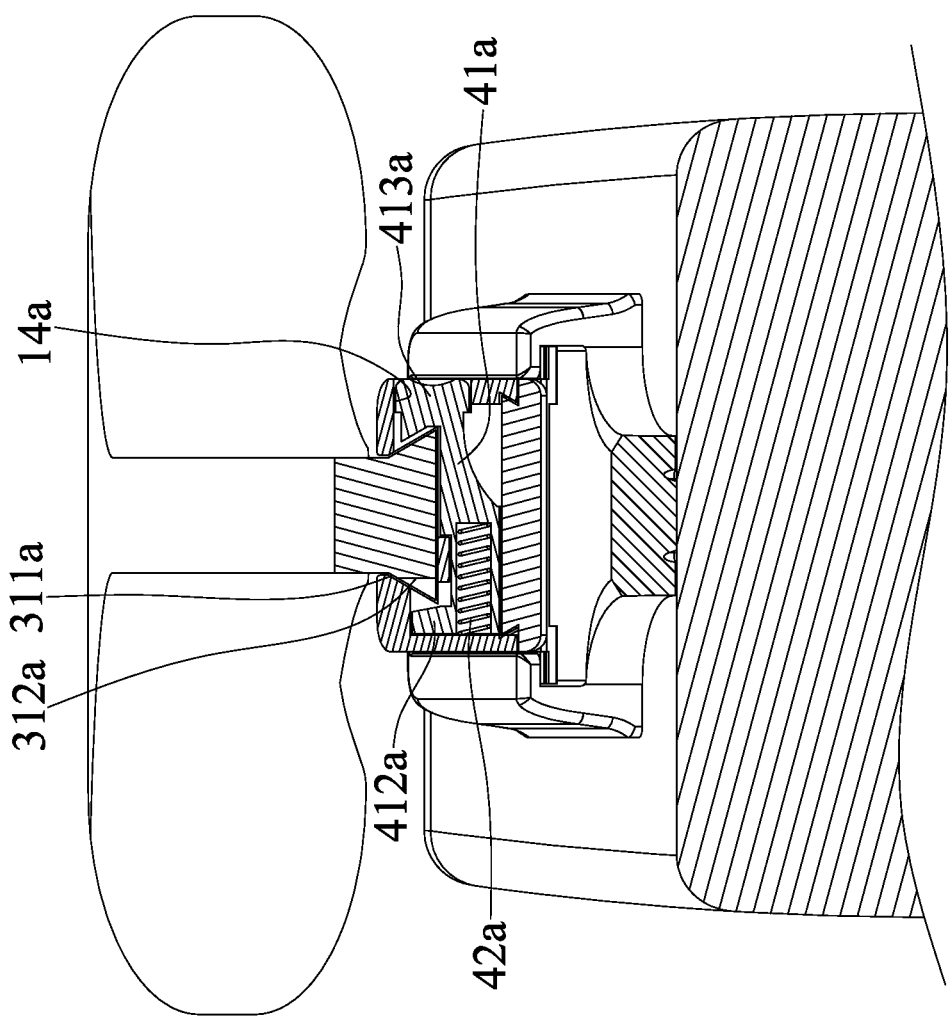

With reference to FIGS. 1-6, a bicycle saddle accessory coupling device of a first embodiment according to the present invention comprises a body 10, a first accessory 20, a second accessory 30, and a positioning unit 40. The body 10 can be attached to a bow of a bicycle saddle, as shown in FIG. 6. The first and second accessories 20 and 30 can be independently and detachably mounted to the body 10 for indirect connection with the bicycle saddle. The positioning unit 40 is disposed on the body 10 for selectively fixing the first accessory 20 and the second accessory 30.

The body 10 includes an attaching portion 11 configured to be coupled to a bicycle saddle, a first connecting portion 12, and a second connecting portion 13 located between the attaching portion 11 and the first connecting portion 12. The first accessory 20 includes a first guiding portion 21 removably connected to the first connecting portion 12 and a first coupling portion 221. The second accessory 30 includes a second guiding portion 31 removably connected to the second connecting portion 13 and a second coupling portion 312. The positioning unit 40 is disposed on the body 10 and is removably coupled to the first coupling portion 221 and the second coupling portion 312. Furthermore, the first accessory 20 has a first operative portion 23, and the second accessory 30 has a second operative portion 32. The first operative portion 23 and the second operative portion 32 can have different functions. In this embodiment, the first operative portion 23 is a saddle bag, and the second operative portion 32 is a saddle lamp.

To removably connect the first and second accessories 20 and 30 to the body 10, the first connecting portion 12 includes two sides each having a first guiding edge 121. The first guiding portion 21 can be in the form of a groove and includes two sidewalls each having a first guiding groove 211 removably coupled with an associated one of the first guiding edges 121. The second connecting portion 13 can be in the form of a groove and includes two sidewalls each having a second guiding groove 131. The second guiding portion 31 includes two sides each having a second guiding edge 311 removably coupled with an associated one of the second guiding grooves 131. Each of the first and second guiding grooves 211 and 131 can be a dovetail groove.

Furthermore, to achieve the positioning function between the positioning unit 40 and the first and second accessories 20 and 30 (namely, the first and second accessories 20 and 30 can only be detached from the body 10 by manual operation of a user), the first accessory 20 includes a first control member 22 extending from and pivotable relative to the first guiding portion 21, and the first coupling portion 221 is disposed on the first control member 22 and is selectively coupled with the positioning unit 40 in response to pivotable movement of the first control member 22 relative to the first guiding portion 21.

In this embodiment, the second coupling portion 312 is formed on a bottom side of the second guiding portion 31. The positioning unit 40 includes a second control member 41 extending from the first connecting portion 12 and pivotable relative to the second connecting portion 13. The second control member 41 includes a first limiting portion 411 removably coupled with the first coupling portion 221 and a second limiting portion 412 removably coupled with the second coupling portion 312. The first limiting portion 411 is formed on a bottom side of the second control member 41 and is selectively coupled with the first coupling portion 221 in response to the pivotal movement of the first control member 22 relative to the first guiding portion 21. The second limiting portion 412 is formed on a top side of the second control member 41 and is selectively coupled with the second coupling portion 312 in response to the pivotal movement of the second control member 41 relative to the second connecting portion 13. Furthermore, the bottom side of the second guiding portion 31 includes an abutting portion 313 opposite to the second coupling portion 312. The abutting portion 313 abuts against the first limiting portion 411 when the second guiding portion 31 is coupled with the second guiding grooves 131. Thus, the user can press the first control member 22 and the second control member 41 to detach the first accessory 20 or the second accessory 30 from the body 10 according to need.

FIGS. 7-12 show a bicycle saddle accessory coupling device of a second embodiment according to the present invention. The structure of the bicycle saddle accessory coupling device of this embodiment is substantially the same as that of the first embodiment except the following differences. Specifically, the body 10a includes a through-hole 14a extending through one of the two sidewalls of the second connecting portion 13a and intercommunicating with the second connecting portion 13a. The second coupling portion 312a is formed on one of the second guiding edges 311a. The positioning unit 40a includes a first limiting portion 411a formed on a bottom side of the first connecting portion 12a and a second control member 41a extending through the through-hole 14a and movable relative to the body 10a. The first limiting portion 411a is selectively coupled with the first coupling portion 221 in response to the pivotal movement of the first control member 22 relative to the first guiding portion 21. The second control member 41a includes a second limiting portion 412a and a pressing portion 413a on two opposite ends of the second control member 41a, respectively. The second limiting portion 412a is selectively coupled with the second coupling portion 312a in response to movement of the second control member 41a relative to the body 10a. The pressing portion 413a is selectively exposed outside of the through-hole 14a in response to the movement of the second control member 41a relative to the body 10a. The positioning unit 40a further includes an elastic element 42a disposed between the second control member 41a and the second connecting portion 13a. The elastic element 42a is selectively compressed by the second control member 41a in response to the movement of the second control member 41a relative to the body 10a. Thus, the user can press the pressing portion 413a to move the second control member 41a relative to the body 10a, disengaging the second limiting portion 412a from the second coupling portion 312a. Then, the second accessory 30a can be detached from the body 10a.

Figure 13:
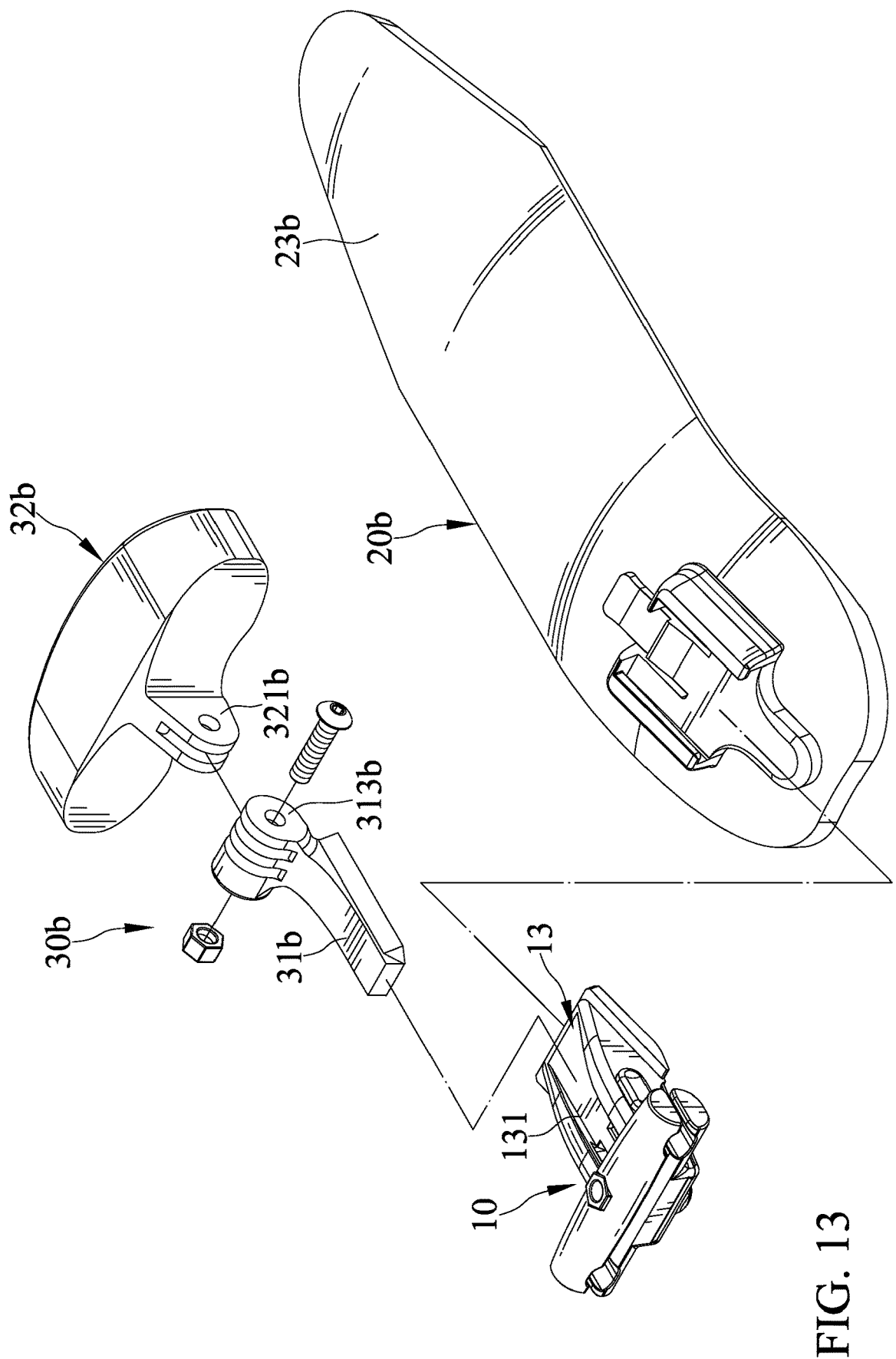
FIG. 13 is an exploded, perspective view of a bicycle saddle accessory coupling device of a third embodiment according to the present invention.

FIG. 13 shows a bicycle saddle accessory coupling device of a third embodiment according to the present invention. The structure of the bicycle saddle accessory coupling device of this embodiment is substantially the same as that of the second embodiment except the following differences. Specifically, the first operative portion 23b of the first accessory 20b of the third embodiment is a rear fender. The second guiding portion 31b includes a first pivotal end 313b. The second accessory 30b further includes a second operative portion 32b having a second pivotal end 321b pivotably connected to the first pivotal end 313b. Thus, the second operative portion 32b can pivot relative to the second guiding portion 31b to adjust the angular position.

Figure 14:
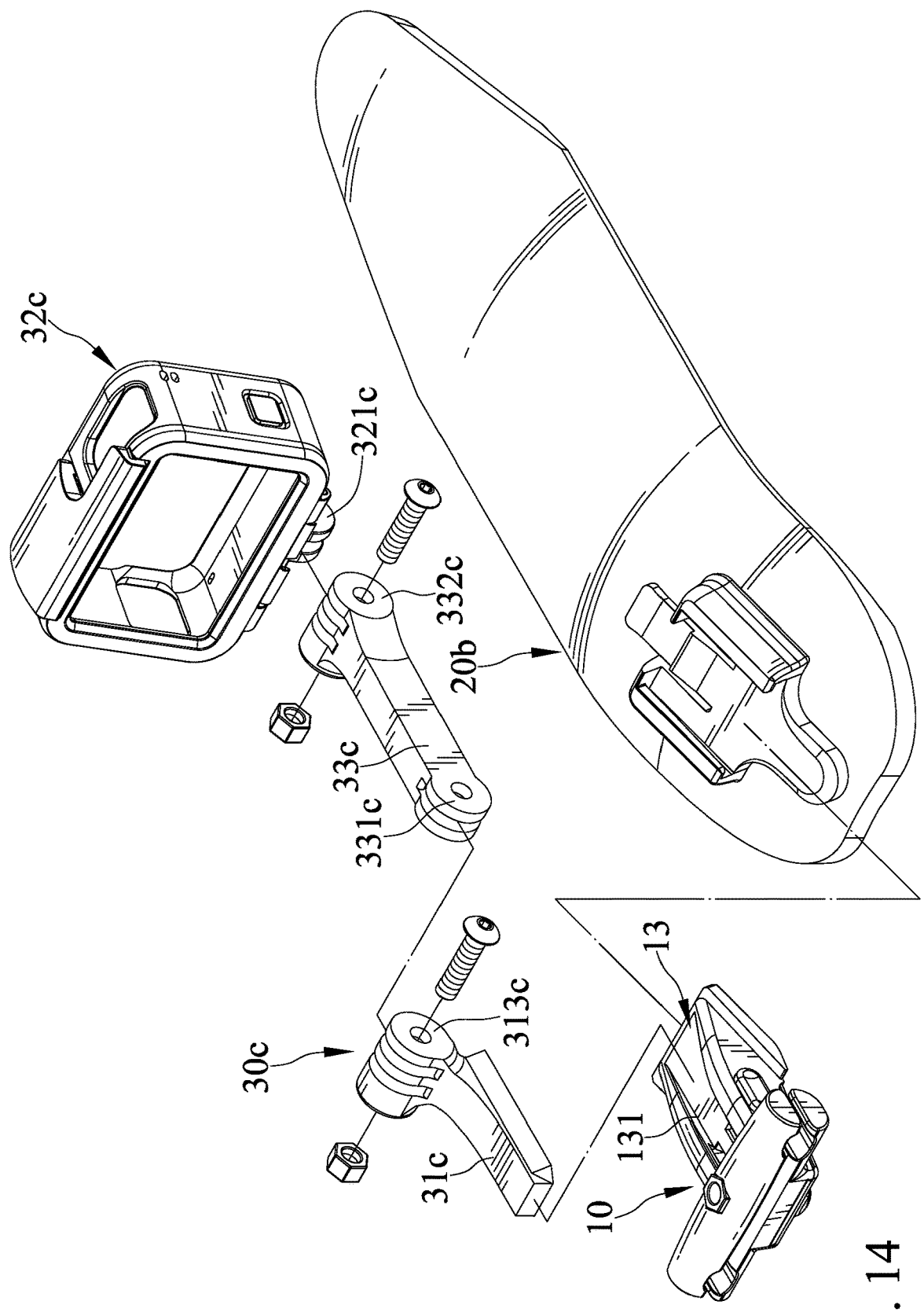
FIG. 14 is an exploded, perspective view of a bicycle saddle accessory coupling device of a fourth embodiment according to the present invention.

FIG. 14 shows a bicycle saddle accessory coupling device of a fourth embodiment according to the present invention. The structure of the bicycle saddle accessory coupling device of this embodiment is substantially the same as that of the second embodiment except the following differences. Specifically, the second operative portion 32c of the second accessory 30c is a protective casing. The second guiding portion 31c includes a first pivotal end 313c. The second accessory 30c further includes a second operative portion 32c and a pivotal arm 33c. The second operative portion 32c includes a second pivotal end 321c. The pivotal arm 33c includes a third pivotal end 331c and a fourth pivotal end 332c which are formed on two opposite ends of the pivotal arm 33c and which are pivotably connected to the first pivotal end 313c and the second pivotal end 321c, respectively. Thus, the second operative portion 32c can pivot relative to the pivotal arm 33c, which, in turn, can pivot relative to the second guiding portion 31c, thereby adjusting the angular position.

In view of the above, in the bicycle saddle accessory coupling devices of above embodiments according to the present invention, the first accessory 20, 20b and the second accessory 30, 30a, 30b, 30c can be indirectly connected to the bicycle saddle via the body 10, 10a.

Although specific embodiments have been illustrated and described, numerous modifications and variations are still possible without departing from the scope of the invention. The scope of the invention is limited by the accompanying claims.

The invention claimed is:

1. A bicycle saddle accessory coupling device comprising:
   a body including an attaching portion configured to be coupled to a bicycle saddle, a first connecting portion, and a second connecting portion located between the attaching portion and the first connecting portion, wherein the first connecting portion includes two sides each having a first guiding edge, wherein the second connecting portion is in a form of a groove and includes two sidewalls each having a second guiding groove;
   a first accessory including a first guiding portion removably connected to the first connecting portion and a first coupling portion, wherein the first guiding portion includes two sidewalls each having a first guiding groove removably coupled with an associated one of the first guiding edges, wherein the first accessory includes a first control member extending from and pivotable relative to the first guiding portion, and wherein the first coupling portion is disposed on the first control member and is selectively coupled with a positioning unit in response to pivotable movement of the first control member relative to the first guiding portion;
   a second accessory including a second guiding portion removably connected to the second connecting portion and a second coupling portion, wherein the second guiding portion includes two sides each having a second guiding edge removably coupled with an associated one of the second guiding grooves; and
   the positioning unit disposed on the body and removably coupled to the first coupling portion and the second coupling portion.

2. The bicycle saddle accessory coupling device as claimed in claim 1, wherein each of the first and second guiding grooves is a dovetail groove.

3. The bicycle saddle accessory coupling device as claimed in claim 1, wherein the body includes a through-hole extending through one of the two sidewalls of the second connecting portion and intercommunicating with the second connecting portion, wherein the second coupling portion is formed on one of the second guiding edges, wherein the positioning unit includes a first limiting portion formed on a bottom side of the first connecting portion and a second control member extending through the through-hole and movable relative to the body, wherein the first limiting portion is selectively coupled with the first coupling portion in response to the pivotal movement of the first control member relative to the first guiding portion, wherein the second control member includes a second limiting portion and a pressing portion on two opposite ends of the second control member, respectively, wherein the second limiting portion is selectively coupled with the second coupling portion in response to movement of the second control member relative to the body, and wherein the pressing portion is selectively exposed outside of the through-hole in response to the movement of the second control member relative to the body.

4. The bicycle saddle accessory coupling device as claimed in claim 3, wherein the positioning unit further includes an elastic element disposed between the second control member and the second connecting portion, and wherein the elastic element is selectively compressed by the second control member in response to the movement of the second control member relative to the body.

* * * * *